(12) United States Patent
Takahata

(10) Patent No.: US 10,474,937 B2
(45) Date of Patent: Nov. 12, 2019

(54) IMAGE FORMING APPARATUS AND NON-TRANSITORY COMPUTER READABLE MEDIUM

(71) Applicant: FUJI XEROX CO., LTD., Tokyo (JP)

(72) Inventor: Koji Takahata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/362,194

(22) Filed: Nov. 28, 2016

(65) Prior Publication Data

US 2017/0357883 A1 Dec. 14, 2017

(30) Foreign Application Priority Data

Jun. 13, 2016 (JP) .................................. 2016-117324

(51) Int. Cl.
*G06K 15/00* (2006.01)
*G06F 3/12* (2006.01)
*H04N 1/00* (2006.01)

(52) U.S. Cl.
CPC ....... *G06K 15/4035* (2013.01); *G06F 3/1208* (2013.01); *G06F 3/1256* (2013.01); *H04N 1/00023* (2013.01); *H04N 1/00633* (2013.01)

(58) Field of Classification Search
CPC . G06K 15/4035; G06F 3/1208; G06F 3/1256; H04N 1/00023; H04N 1/00633
USPC ................................. 358/1.9, 1.15, 504, 538
See application file for complete search history.

(56) References Cited

U.S. PATENT DOCUMENTS

| 8,502,992 B2* | 8/2013 | Kurihara | G03G 15/6573 |
| | | | 358/1.12 |
| 2006/0061807 A1* | 3/2006 | Matsuda | G06F 3/1212 |
| | | | 358/1.15 |
| 2007/0146754 A1* | 6/2007 | Chang | H04N 1/52 |
| | | | 358/1.9 |
| 2011/0228298 A1 | 9/2011 | Okada | |
| 2014/0333945 A1* | 11/2014 | Sakata | H04N 1/00045 |
| | | | 358/1.12 |

FOREIGN PATENT DOCUMENTS

| JP | 2009-025652 A | 2/2009 |
| JP | 2011-189688 A | 9/2011 |

* cited by examiner

*Primary Examiner* — Quang N Vo
(74) *Attorney, Agent, or Firm* — Oliff PLC

(57) ABSTRACT

An image forming apparatus includes a first ejection destination, a second ejection destination, and a controller. The first ejection destination is a destination to which sheets having an image formed thereon by using rendered data are to be ejected. The second ejection destination is a destination to which a sheet serving as a sample print among the sheets is to be ejected. The controller sets the sheet serving as the sample print by using at least one of pixel density, number of colored pixels, number of extra colors, number of objects, object size, and object color information that are included in the rendered data.

12 Claims, 16 Drawing Sheets

IMAGE FORMING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-117324 filed Jun. 13, 2016.

BACKGROUND

(i) Technical Field

The present invention relates to an image forming apparatus and a non-transitory computer readable medium.

(ii) Related Art

In an image forming apparatus, an output of a job ejected to a high capacity stacker tray (a high capacity stacker (HCS)) is viewed by a user only after the output has been ejected, and thus the image quality and hue of the output is checked only after outputting has been completed.

A dynamic sample print function has been suggested in which operation of a specific button enables any one sheet of an output as a sample to be output to a tray provided above a high capacity stacker tray, so that a user is able to check the image quality and hue thereof.

FIGS. 15A to 15C illustrate a basic concept of the dynamic sample print function. FIG. 15A illustrates an operation of executing a print job and ejecting an output of the print job to a high capacity stacker tray inside an image forming apparatus. In FIG. 15A, a downward arrow represents ejection to the high capacity stacker tray.

FIG. 15B illustrates a case where a user presses a dynamic sample button during the print job. A control mechanism of the image forming apparatus detects the press of the dynamic sample button and accordingly switches an ejection destination of an output from the high capacity stacker tray to an upper tray provided above the high capacity stacker tray. In FIG. 15B, an upward arrow represents ejection to the upper tray. The user views the output ejected to the upper tray and checks the image quality and hue thereof.

FIG. 15C illustrates an operation performed thereafter. An output of the print job is ejected to the high capacity stacker tray inside the image forming apparatus again.

FIG. 16 illustrates an output in a case where the user presses the dynamic sample button at certain timing during a 10-page one-sided print job. In FIG. 16, 1, 2, 3, . . . 10 represent the page numbers of the output. If the user presses the dynamic sample button after page 4 has been ejected, the control mechanism switches the ejection destination of page 5 as the next page to the upper tray, ejects page 5 as a sample print, and then ejects page 5 and the subsequent pages to the high capacity stacker tray. The user views page 5 ejected as a sample print and checks the image quality and hue thereof.

SUMMARY

According to an aspect of the invention, there is provided an image forming apparatus including a first ejection destination, a second ejection destination, and a controller. The first ejection destination is a destination to which sheets having an image formed thereon by using rendered data are to be ejected. The second ejection destination is a destination to which a sheet serving as a sample print among the sheets is to be ejected. The controller sets the sheet serving as the sample print by using at least one of pixel density, number of colored pixels, number of extra colors, number of objects, object size, and object color information that are included in the rendered data.

BRIEF DESCRIPTION OF THE DRAWINGS

An Exemplary embodiment of the present invention will be described in detail based on the following figures, wherein.

DETAILED DESCRIPTION

Hereinafter, an exemplary embodiment of the present invention will be described with reference to the drawings.

First, the basic principle of the exemplary embodiment will be described.

Figure 16:
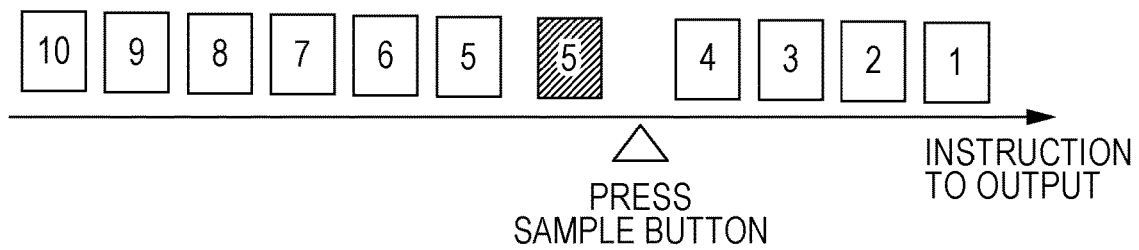
FIG. 16 is a schematic diagram illustrating ejection of a dynamic sample print.

To maintain the productivity of an image forming apparatus while outputting a sample print, it is effective to eject, upon detection of a user operation of a sample button, a sheet to be output next as a sample print (see FIG. 16). However, if a sheet to be output next is indiscriminately ejected as a sample print, a sheet having few images or a sheet having only text may be output as a sample print, which may be inappropriate as a sample print for checking the image quality and hue.

Accordingly, in the exemplary embodiment, a sheet (page) to be output next is not discriminately set as a sample print, but focus is placed on the pixel density, the number of colored pixels, the number of extra colors, the number of objects, the object size, or the object color information of each sheet (page), and a sheet (page) having a sufficient pixel density, a sufficient number of colored pixels, a sufficient number of extra colors, a sufficient number of objects, a sufficient object size, or sufficient object color information to check the image quality and hue is automatically set as a sample sheet. The pixel density, the number of colored pixels, the number of extra colors, the number of objects, the object size, or the object color information is calculated from rendered data (raster data), which is created by interpreting a print job.

In the case of using the pixel density, the number of colored pixels, the number of extra colors, the number of objects, the object size, or the object color information of sheets, the pixel density or another parameter of each sheet is compared with a threshold, and a sheet having a pixel density or another parameter that is equal to or higher than the threshold may be set as a sample print. Alternatively, collective processing may be performed in units of groups each including a predetermined number of sheets, and a sheet having the highest pixel density or another parameter may be set as a sample sheet.

In the exemplary embodiment, a sheet that has a specific extra color used therein and that enables a user to check the hue of the extra color is automatically set as a sample sheet, in consideration that the extra color is given precedence by the user. Presence or absence of a specific extra color is determined from rendered data. Here, the "extra color" is a color designated by the user or a less reproducible color that is not accurately expressed by a combination of CMYK. The user is able to designate, set, and register a certain color as an extra color. A toner color other than CMYK process colors may be called an extra color, and such a color is also included in the extra color according to the exemplary embodiment. An example of a specific extra color is a corporate color a company in a case where the user is a company, but the exemplary embodiment is not limited thereto. The object color information includes information indicating whether the color of the object is a single color or a gradation/raster color.

An algorithm for setting a sample print by using any one of the pixel density, the number of colored pixels, the number of extra colors, the number of objects, the object size, and the object color information and an algorithm for setting a sample print by using presence or absence of an extra color may be used independently of each other or in combination with each other. In the latter case, for example, a sample print is set by using presence or absence of an extra color, and, if no extra colors are used, a sample print is set by complementarily using any one of the pixel density, the number of extra colors, and the number of objects. In the case of using only the algorithm for setting a sample print by using any one of the pixel density, the number of colored pixels, the number of extra colors, the number of objects, the object size, and the object color information, the number of extra colors may include presence or absence of an extra color (0 or 1).

A sheet (page) having an image formed thereon by using rendered data is ejected to a first ejection destination. Specifically, the first ejection destination is an inner ejection destination such as a high capacity stacker tray. On the other hand, a sheet (page) that is set as a sample print is ejected to a second ejection destination, which is different from the first ejection destination. The second ejection destination is an upper ejection destination such as an upper tray, which may be easily visible to the user.

Hereinafter, the exemplary embodiment will be described in detail.

Figure 1:
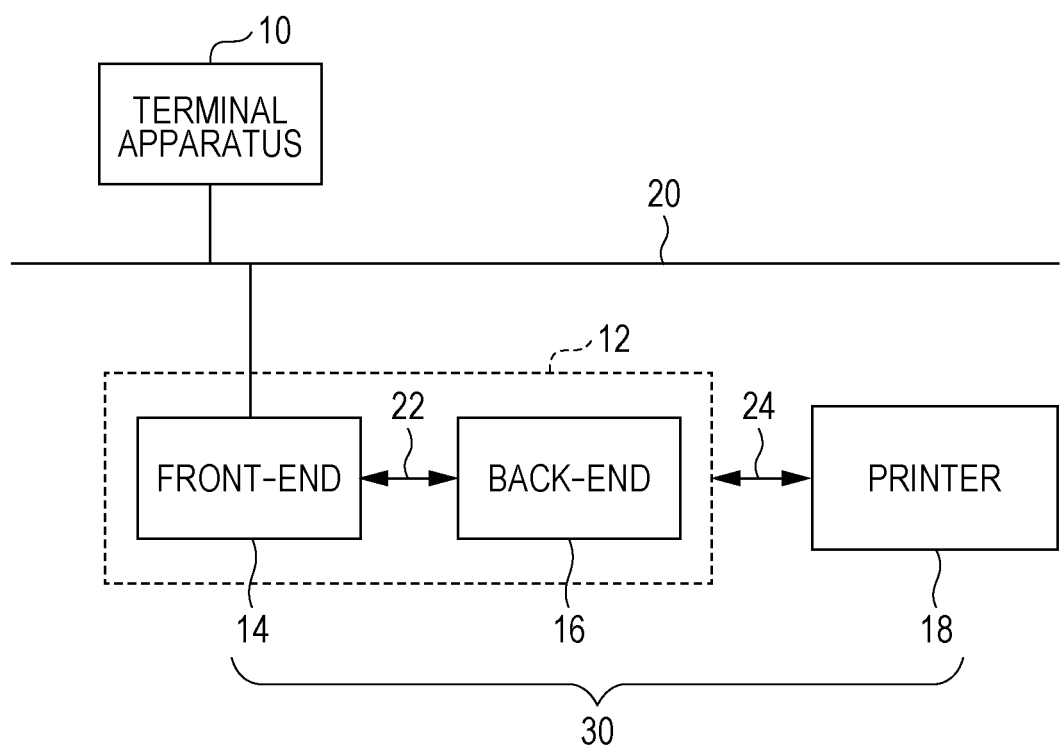
FIG. 1 is a diagram illustrating the configuration of a system according to the exemplary embodiment.

FIG. 1 is a functional block diagram of a system including an image forming apparatus according to the exemplary embodiment. The system includes a terminal apparatus 10, a control apparatus 12, and a printer 18. The control apparatus 12 includes a front-end 14 and a back-end 16. The terminal apparatus 10 and the control apparatus 12 are connected to each other through a communication medium 20, and the control apparatus 12 and the printer 18 are connected to each other through a communication medium 24. The front-end 14 and the back-end 16 are connected to each other through a communication medium 22.

Each of the communication media 20, 22, and 24 is, for example, a data communication network such as a local area network (LAN). The communication media 20, 22, and 24 are not necessarily the same communication media.

The terminal apparatus 10 is connected to the front-end 14 of the control apparatus 12 through the communication medium 20, and transmits a print job that includes a document print instruction to the front-end 14 in response to a user's instruction.

The front-end 14 includes a print job receiver and an interpreter.

The print job receiver receives a print job from the terminal apparatus 10. The print job includes an instruction to print a document and data of the document to be printed that is described in a page description language (PDL). The PDL is a computer programming language that is used to cause an information processor to execute display processing, print processing, and so forth. The data described in the PDL includes text and figures that form the document to be printed, and position information, format information, and color information on an object such as an image. The print job receiver supplies the PDL data included in the received print job to the interpreter.

The interpreter interprets the PDL data obtained from the print job receiver, generates intermediate data including an instruction representing a procedure of generating rendered data in accordance with the interpretation result, and outputs the intermediate data. The rendered data is print image data that represents the image to be printed in the format compatible with the printer 18, and is, for example, data in the raster format. The intermediate data is data having an intermediate granularity between the PDL data and the rendered data. The format of the intermediate data is expressed by fractionalizing an image object described in the PDL into small elements having simple shapes. In an example of the intermediate data, an object is expressed by a set of three data items: bounding box designation, color designation, and shape designation. Bounding box designation is information defining a rectangle that encompasses the object and includes the coordinates of an upper left corner and a lower right corner of the rectangle. Color designation is information defining the colors of individual pixels of the object and includes information representing the color format and color data. The color format is information defining the way of determining the colors of individual pixels of the object, for example, single color (all the pixels have the same color), gradation (the color continuously changes in a direction in which the pixels are arranged), raster (the color is designated for individual pixels), and so forth. The color data is data representing the colors of individual pixels in a data format corresponding to the color format. For example, in the case of a single color, the color data is a color value of the single color expressed by the coordinates in a color space of basic colors (process colors) of cyan, magenta, yellow, and black (CMYK). In the case of an extra color, the color data is the name of the extra color. In the case of gradation, the color data includes information representing the initial value and change rate of the color. In the case of raster, the color data is data including color values of individual pixels. Shape designation is information defining the shape of the object. The interpreter generates such intermediate data and supplies it to the back-end 16.

The back-end 16 includes an intermediate data buffer, a rendering unit, and an output buffer.

The intermediate data buffer stores the intermediate data received from the front-end 14.

The rendering unit reads the intermediate data stored in the intermediate data buffer and generates rendered data (raster data) in accordance with the read intermediate data. For example, the rendering unit obtains, from the color data of an object, the values of individual pixels in the range indicated by the shape data of the object, writes the pixel values in the addresses corresponding to the respective pixels in a page memory, and thereby renders the object. As a result of rendering all objects included in one page, a raster image of the page is formed. The pieces of rendered data of individual pages that have been generated are stored in the output buffer and are sequentially read into the printer 18.

The printer 18 prints the pieces of rendered data of the individual pages read from the output buffer on sheets of paper.

The terminal apparatus 10 and the control apparatus 12 including the front-end 14 and the back-end 16 illustrated in FIG. 1 may be implemented by, for example, general-purpose computers. The computer has a configuration in which a central processing unit (CPU), a read only memory (ROM), a random access memory (RAM), an input/output interface, and so forth are connected to each other through a bus. Also, a secondary storage device such as a hard disk drive (HDD) or a solid state drive (SSD), or a DVD drive is connected to the bus.

A specific example of hardware that implements the front-end 14 and the back-end 16 is a blade server that includes plural information processing apparatuses, each functioning as a server, mounted in one housing. One blade mounted in the blade server may function as the front-end 14, and another one blade mounted in the blade server may function as the back-end 16.

Alternatively, the front-end 14 and the back-end 16 may be constructed on different computer apparatuses that are mounted in different housings. Alternatively, the front-end 14 and the back-end 16 may be constructed on the same computer apparatus.

In FIG. 1, the control apparatus 12 including the front-end 14 and the back-end 16 is separated from the printer 18. Alternatively, the control apparatus 12 and the printer 18 may be integrated into an image forming apparatus. Hereinafter, a description will be given of a case where the control apparatus 12 and the printer 18 are integrated together to function as an image forming apparatus 30.

Figure 2:
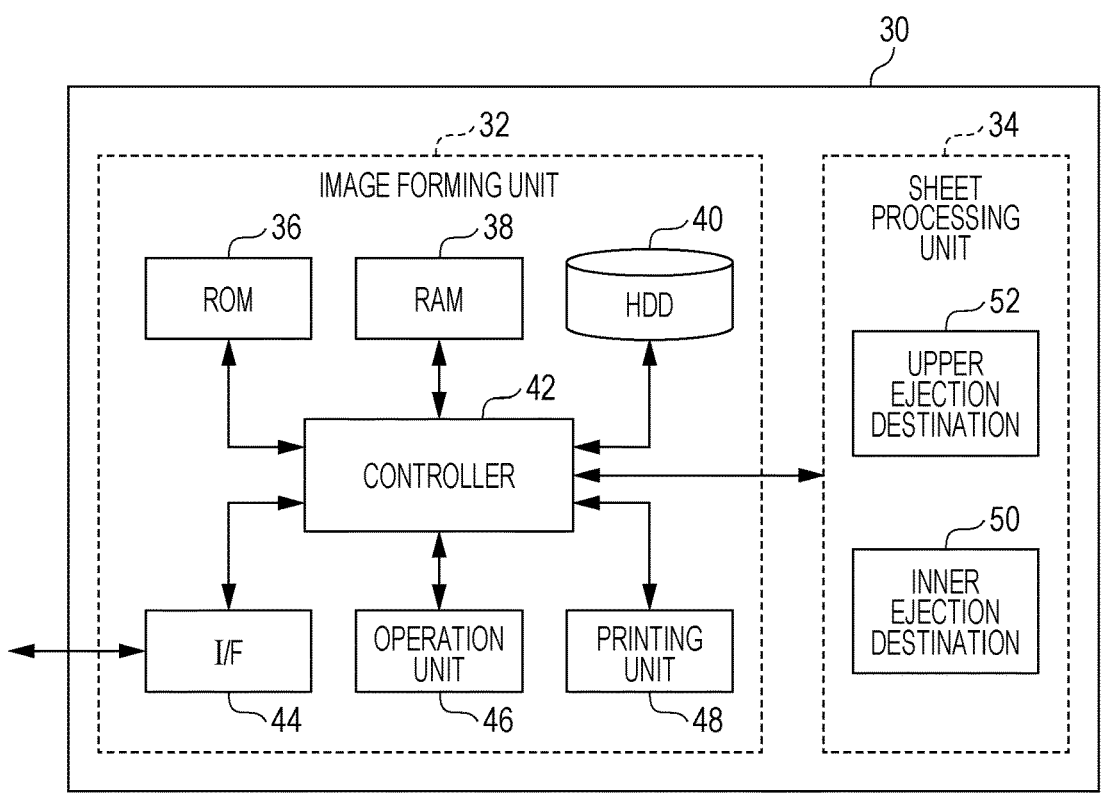
FIG. 2 is a diagram illustrating the configuration of an image forming apparatus according to the exemplary embodiment.

FIG. 2 is a block diagram illustrating the configuration of the image forming apparatus 30. The image forming apparatus 30 includes an image forming unit 32 and a sheet processing unit 34. The image forming unit 32 includes a ROM 36, a RAM 38, an HDD 40, a controller 42 formed of one or plural CPUs, an interface (I/F) 44, an operation unit 46 such as a touch screen, and a printing unit 48. The sheet processing unit 34 includes an inner ejection destination 50 such as a high capacity stacker tray and an upper ejection destination 52 such as an upper tray.

The controller 42 formed of one or plural CPUs receives an instruction of individual processes to be executed by the front-end 14 and the back-end 16, that is, a print job instruction from the terminal apparatus 10 via the I/F 44, generates intermediate data by interpreting PDL data, and generates rendered data (raster data) from the generated intermediate data, in accordance with a process program stored in the ROM 36. Also, the controller 42 displays a sample button on the operation unit 46. If the controller 42 detects that the sample button has been operated by a user, the controller 42 automatically determines a sample print from among the sheets to be output thereafter. Also, the controller 42 automatically switches between the inner ejection destination 50 and the upper ejection destination 52 of the sheet processing unit 34 so as to eject an output which is not a sample print to the inner ejection destination 50 and to eject an output which is a sample print to the upper ejection destination 52 so that the user views and checks the sample print.

The printing unit 48 has a configuration as a printer according to the related art and prints rendered data on a sheet. Specifically, in the printing unit 48, laser light modulated in accordance with rendered data is reflected by a polygon mirror and is applied onto a photoconductive drum. A latent image formed on the photoconductive drum is developed by using CMYK toners, and a resulting toner image is transferred onto a sheet that is placed on a transfer drum. The sheet on the transfer drum is transported to a fixing device, where heat and pressure are applied to the toner image on the sheet by a heat source such as a halogen heater and a roller, so that the toner image is fused into place. The transport direction of the sheet having the toner image fused thereon is determined by an ejection flapper. In the case of one-sided printing, the sheet is transported toward the sheet processing unit 34. In the case of double-sided printing, the sheet is returned and printing on the other side is performed.

The sheet processing unit 34 includes the inner ejection destination 50 such as a high capacity stacker tray and the upper ejection destination 52 such as an upper tray. The controller 42 performs switching control to determine which of the inner ejection destination 50 and the upper ejection destination 52 is to be used as an ejection destination of an output on which one-sided or double-sided printing has been performed. That is, the controller 42 determines a sample print through a process described below, and then designates the upper ejection destination 52 as the ejection destination of the sample print and designates the inner ejection destination 50 as the ejection destination of the sheets other than the sample print. For example, in the case of performing a 10-page one-sided print job, if page 5 is determined to be a sample print, the inner ejection destination 50 is designated as the ejection destination of pages 1 to 10, and the upper ejection destination 52 is designated as the ejection destination of page 5.

Next, a process of determining a sample print performed by the controller 42 will be described. The process of determining a sample print is implemented by sequentially executing, with one or plural processors, processes in accordance with a process program stored in the ROM 36 by using the RAM 38 as a working memory.

First Determination Process

Figure 3:
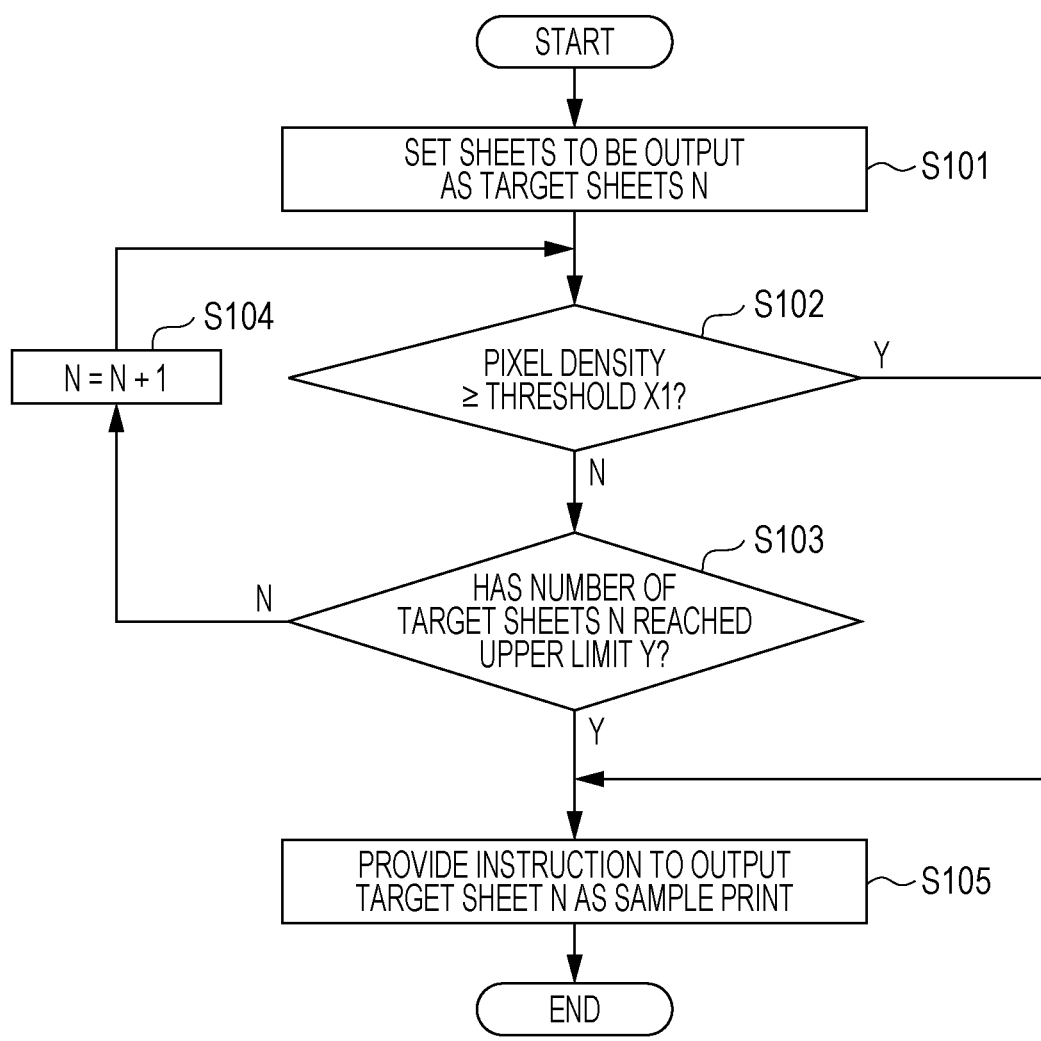
FIG. 3 is a flowchart of a first determination process.

FIG. 3 is a flowchart illustrating a first determination process of determining a sample print, performed by the controller 42. The process illustrated in this flowchart is triggered by a user operation of pressing the sample button displayed on the operation unit 46 and detection of the user operation by the controller 42.

First, the controller 42 sets, as target sheets N, sheets to be output in response to an output instruction (S101). Here, the target sheets N are sheets that may become a target of a sample print, specifically, sheets to be output that have not been output at the time when the sample button is pressed in a print job. For example, in a 10-page one-sided print job, if the sample button is pressed after page 4 has been output, pages 5 to 10 which have not been output are set as target sheets N. N is a count parameter starting from 1. In the foregoing example, N=1 corresponds to page 5, N=2 corresponds to page 6, N=3 corresponds to page 7, N=4 corresponds to page 8, and the same logic applies to the other pages.

Subsequently, the controller 42 calculates the pixel density of the target sheet N=1 and judges whether or not the calculated pixel density is equal to or higher than a threshold X1 (S102). The pixel density is calculated based on a sheet size and an image size. The image size is the total sum of the sizes of all the images included in rendered data. For example, if page 5 has an image size of 10000 KB and a sheet size of A4 (29.7 cm×21.0 cm in the long edge feed (LEF) orientation), the pixel density is 10000/(29.7×21.0)= 16.03 ($KB/cm^2$).

The threshold X1 is a value of pixel density that is considered sufficient for the user to view a sample print and check the image quality and hue thereof, and is set in advance and stored in the ROM 36. The threshold X1 is set to, for example, 20.00 ($KB/cm^2$), but is not limited thereto.

If the judgment in step S102 is NO, that is, if the pixel density is lower than the threshold X1, the controller 42 judges whether or not the number of consecutive target sheets N in which pixel density is lower than the threshold X1 has reached a calculated upper limit Y (S103). This judgment is performed to prevent a situation from occurring where, if target sheets N in which pixel density is lower than the threshold X1 are consecutively presented, the time to determine a sample print is delayed accordingly, and the timing to output the sample print is also delayed. The calculated upper limit Y is also set in advance and stored in the ROM 36. The calculated upper limit Y is set to, for example, Y=5, but is not limited thereto. If Y=5, the controller 42 calculates pixel density within the range of N=1 to 4 and compares the calculated pixel density with the threshold X1.

If the judgment in step S103 is NO, that is, if the number of consecutive target sheets N in which pixel density is lower than the threshold X1 has not reached the calculated upper limit Y, the controller 42 increments the count parameter N by 1 (S104) and repeats the process from step S102.

If the judgment in step S103 is YES, that is, if the number of consecutive target sheets N in which pixel density is lower than the threshold X1 has reached the calculated upper limit Y, the controller 42 determines the target sheet N at the time to be a sample print (sample sheet) and provides an instruction to output the sample print (S105). Specifically, the controller 42 designates the upper ejection destination 52 as the ejection destination of the sample print and ejects the sample print to the upper ejection destination 52. For example, if Y=5 and if the pixel density of the target sheet N=4 is lower than the threshold X1, the controller 42 ejects page 8 corresponding to N=4 to the upper ejection destination 52. Of course, page 8 is also ejected to the inner ejection destination 50, and all the pages (pages 1 to 10) are ejected to the inner ejection destination 50 regardless of which page is determined to be a sample print.

On the other hand, if the judgment in step S102 is YES, that is, if the pixel density is equal to or higher than the threshold X1, the controller 42 determines the target sheet N to be a sample print (sample sheet) and provides an instruction to output the sample print (S105). For example, if the pixel density of the target sheet N=2 is equal to or higher than the threshold X1, the controller 42 ejects page 6 corresponding to N=2 to the upper ejection destination 52. The user is able to view the sample print that has been ejected to the upper ejection destination 52 and that has a sufficient pixel density and to check the image quality and hue or the like. After checking the image quality and hue or the like, the user continues the print job if there is no problem, or stops the print job by operating a stop button displayed on the operation unit 46 if there is a problem.

Figure 4:
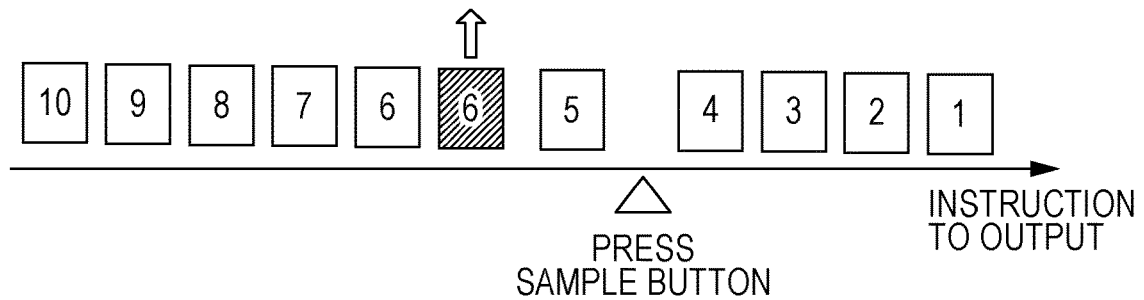
FIG. 4 is a schematic diagram illustrating ejection of a sample print in the first determination process.

FIG. 4 illustrates a process in a case where page 6 corresponding to N=2 is determined to be a sample print. It is assumed that the user operates the sample button after pages 1 to 4 have been output. Among pages 5 to 10 to be output, page 6 is determined to have a pixel density equal to or higher than the threshold X1, is determined to be a sample print, and is ejected to the upper ejection destination 52. In FIG. 4, the hatched portion indicates that the page has been determined to be a sample print, and an upward arrow indicates that the page will be ejected to the upper ejection destination 52. Pages 6 to 10 are ejected to the inner ejection destination 50 like pages 1 to 5. Page 6 is ejected to the upper ejection destination 52 as well as to the inner ejection destination 50.

Second Determination Process

Figure 5:
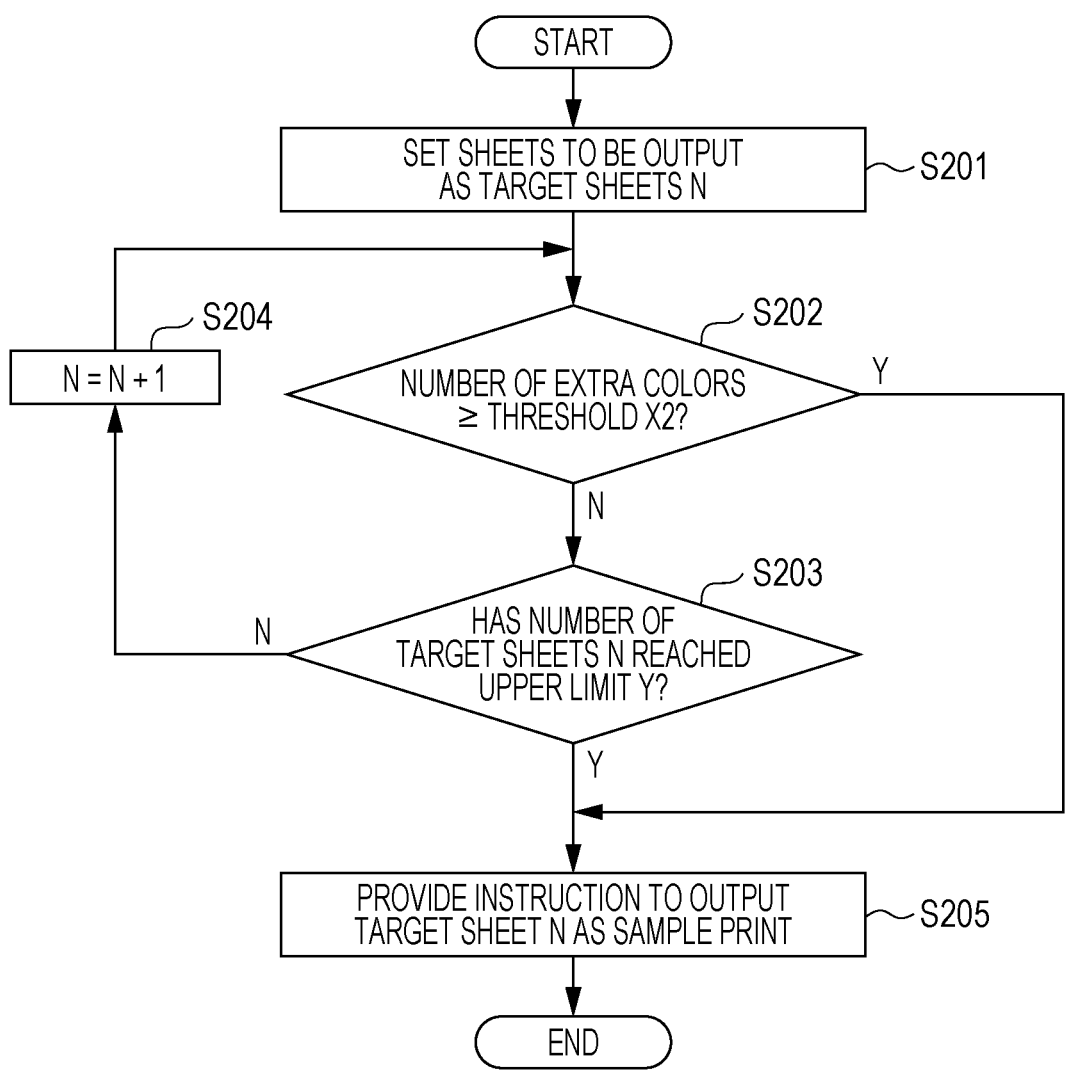
FIG. 5 is a flowchart of a second determination process.

FIG. 5 is a flowchart illustrating a second determination process of determining a sample print performed by the controller 42. The process illustrated in this flowchart is triggered by a user operation of pressing the sample button displayed on the operation unit 46 and detection of the user operation by the controller 42.

In the first determination process, a sample print is determined by using pixel density. In contrast, in the second determination process, a sample print is determined by using the number of extra colors. Here, the "extra color" is a color designated by the user. The user is able to designate, set, and register a certain color as an extra color. A toner color other than CMYK process colors may be called an extra color, and such a color may be included in the extra color.

First, the controller 42 sets, as target sheets N, sheets to be output in response to an output instruction (S201).

Subsequently, the controller 42 calculates the number of extra colors of the target sheet N=1 and judges whether or not the calculated number of extra colors is equal to or larger than a threshold X2 (S202). The threshold X2 is a value of the number of extra colors that is considered sufficient for the user to view a sample print and check the image quality and hue thereof, and is set in advance and stored in the ROM 36. The threshold X2 is set to, for example, 2, but is not limited thereto. The threshold X2 may be determined in accordance with the number of extra colors that are set and registered by the user or the number of toner colors other than CMYK. For example, if the number of extra colors that are set and registered by the user is 3, the threshold X2 may be set to 2. If the number of toner colors other than CMYK is 1, the threshold X2 may be set to 1.

If the judgment in step S202 is NO, that is, if the number of extra colors is smaller than the threshold X2, the controller 42 judges whether or not the number of consecutive target sheets N in which the number of extra colors is smaller than the threshold X2 has reached a calculated upper limit Y (S203). This judgment is performed to prevent a situation from occurring where, if target sheets N in which the number of extra colors is smaller than the threshold X2 are consecutively presented, the time to determine a sample print is delayed accordingly, and the timing to output the sample print is also delayed. The calculated upper limit Y is also set in advance and stored in the ROM 36. The calculated upper limit Y is set to, for example, Y=5, but is not limited thereto. If Y=5, the controller 42 calculates the number of extra colors within the range of N=1 to 4 and compares the calculated number of extra colors with the threshold X2.

If the judgment in step S203 is NO, that is, if the number of consecutive target sheets N in which the number of extra colors is smaller than the threshold X2 has not reached the calculated upper limit Y, the controller 42 increments the count parameter N by 1 (S204) and repeats the process from step S202.

If the judgment in step S203 is YES, that is, if the number of consecutive target sheets N in which the number of extra colors is smaller than the threshold X2 has reached the calculated upper limit Y, the controller 42 determines the target sheet N at the time to be a sample print (sample sheet) and provides an instruction to output the sample print (S205). Specifically, the controller 42 designates the upper ejection destination 52 as the ejection destination of the sample print and ejects the sample print to the upper ejection destination 52. For example, if Y=5 and if the number of extra colors of the target sheet N=4 is smaller than the threshold X2, the controller 42 ejects page 8 corresponding to N=4 to the upper ejection destination 52. Of course, page 8 is also ejected to the inner ejection destination 50, and all the pages (pages 1 to 10) are ejected to the inner ejection destination 50 regardless of which page is determined to be a sample print.

On the other hand, if the judgment in step S202 is YES, that is, if the number of extra colors is equal to or larger than the threshold X2, the controller 42 determines the target sheet N to be a sample print (sample sheet) and provides an instruction to output the sample print (S205). For example, if the number of extra colors of the target sheet N=2 is equal to or larger than the threshold X2, the controller 42 ejects page 6 corresponding to N=2 to the upper ejection destination 52. The user is able to view the sample print that has been ejected to the upper ejection destination 52 and that has a sufficient number of extra colors and to check the image quality and hue or the like. An extra color is considered as a color whose hue is given precedence by the user, and thus an effect of viewing a sample print having a sufficient number of extra colors is apparent. After checking the image quality and hue or the like, the user continues the print job if there is no problem, or stops the print job by operating the stop button displayed on the operation unit 46 if there is a problem.

Third Determination Process

Figure 6:
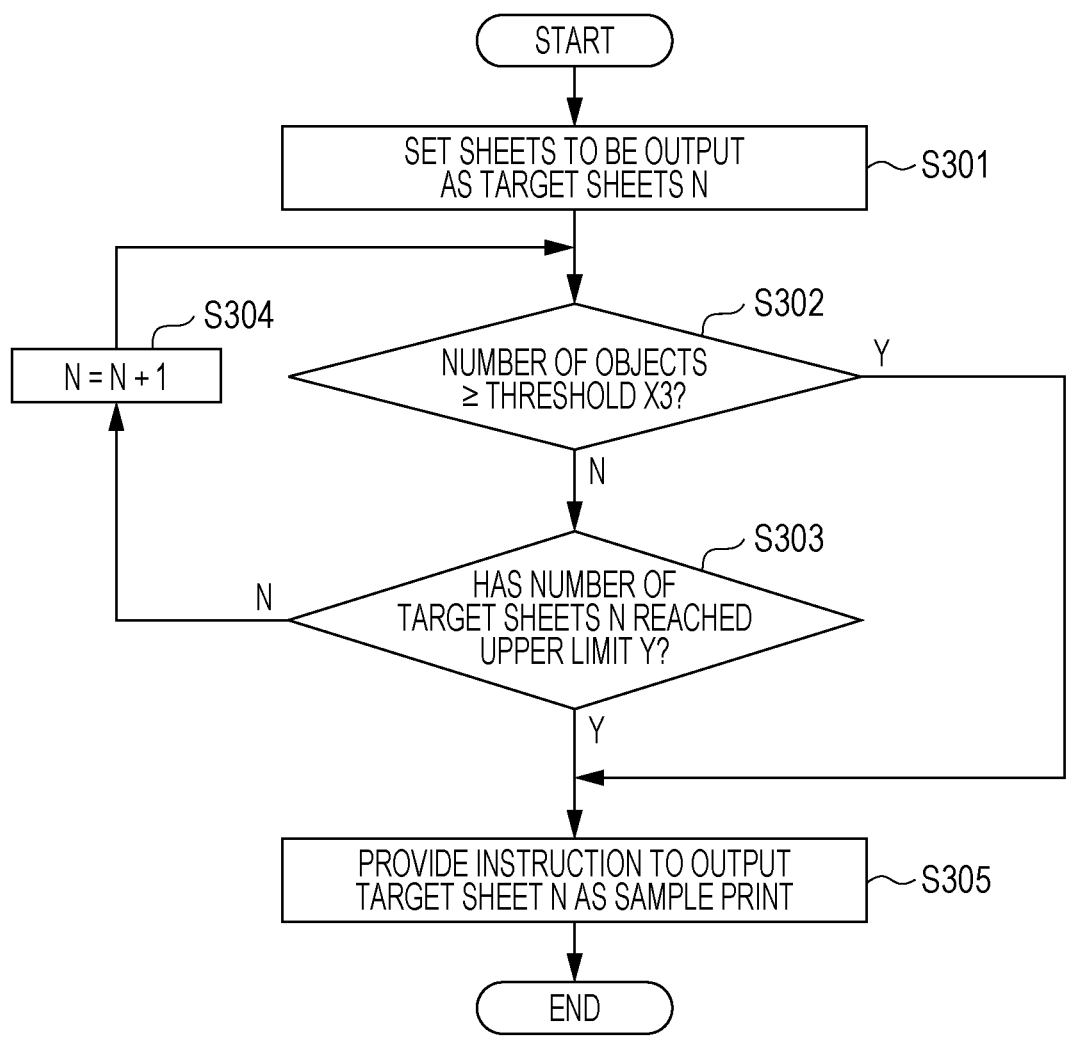
FIG. 6 is a flowchart of a third determination process.

FIG. 6 is a flowchart illustrating a third determination process of determining a sample print performed by the controller 42. The process illustrated in this flowchart is triggered by a user operation of pressing the sample button displayed on the operation unit 46 and detection of the user operation by the controller 42.

In the first determination process, a sample print is determined by using pixel density. In contrast, in the third determination process, a sample print is determined by using the number of objects. The number of objects is the total number of objects in each page included in rendered data.

First, the controller 42 sets, as target sheets N, sheets to be output in response to an output instruction (S301).

Subsequently, the controller 42 calculates the number of objects of the target sheet N=1 and judges whether or not the calculated number of objects is equal to or larger than a threshold X3 (S302). The threshold X3 is a value of the number of objects that is considered sufficient for the user to view a sample print and check the image quality and hue thereof, and is set in advance and stored in the ROM 36.

If the judgment in step S302 is NO, that is, if the number of objects is smaller than the threshold X3, the controller 42 judges whether or not the number of consecutive target sheets N in which the number of objects is smaller than the threshold X3 has reached a calculated upper limit Y (S303). This judgment is performed to prevent a situation from occurring where, if target sheets N in which the number of objects is smaller than the threshold X3 are consecutively presented, the time to determine a sample print is delayed accordingly, and the timing to output the sample print is also delayed. The calculated upper limit Y is also set in advance and stored in the ROM 36. The calculated upper limit Y is set to, for example, Y=5, but is not limited thereto. If Y=5, the controller 42 calculates the number of objects within the range of N=1 to 4 and compares the calculated number of objects with the threshold X3.

If the judgment in step S303 is NO, that is, if the number of consecutive target sheets N in which the number of objects is smaller than the threshold X3 has not reached the calculated upper limit Y, the controller 42 increments the count parameter N by 1 (S304) and repeats the process from step S302.

If the judgment in step S303 is YES, that is, if the number of consecutive target sheets N in which the number of objects is smaller than the threshold X3 has reached the calculated upper limit Y, the controller 42 determines the target sheet N at the time to be a sample print (sample sheet) and provides an instruction to output the sample print (S305). Specifically, the controller 42 designates the upper ejection destination 52 as the ejection destination of the sample print and ejects the sample print to the upper ejection destination 52. For example, if Y=5 and if the number of objects of the target sheet N=4 is smaller than the threshold X3, the controller 42 ejects page 8 corresponding to N=4 to the upper ejection destination 52. Of course, page 8 is also ejected to the inner ejection destination 50, and all the pages (pages 1 to 10) are ejected to the inner ejection destination 50 regardless of which page is determined to be a sample print.

On the other hand, if the judgment in step S302 is YES, that is, if the number of objects is equal to or larger than the threshold X3, the controller 42 determines the target sheet N to be a sample print (sample sheet) and provides an instruction to output the sample print (S305). For example, if the number of objects of the target sheet N=2 is equal to or larger than the threshold X3, the controller 42 ejects page 6 corresponding to N=2 to the upper ejection destination 52. The user is able to view the sample print that has been ejected to the upper ejection destination 52 and that has a sufficient number of objects and to check the image quality and hue or the like. After checking the image quality and hue or the like, the user continues the print job if there is no problem, or stops the print job by operating the stop button displayed on the operation unit 46 if there is a problem.

Fourth Determination Process

Figure 7:
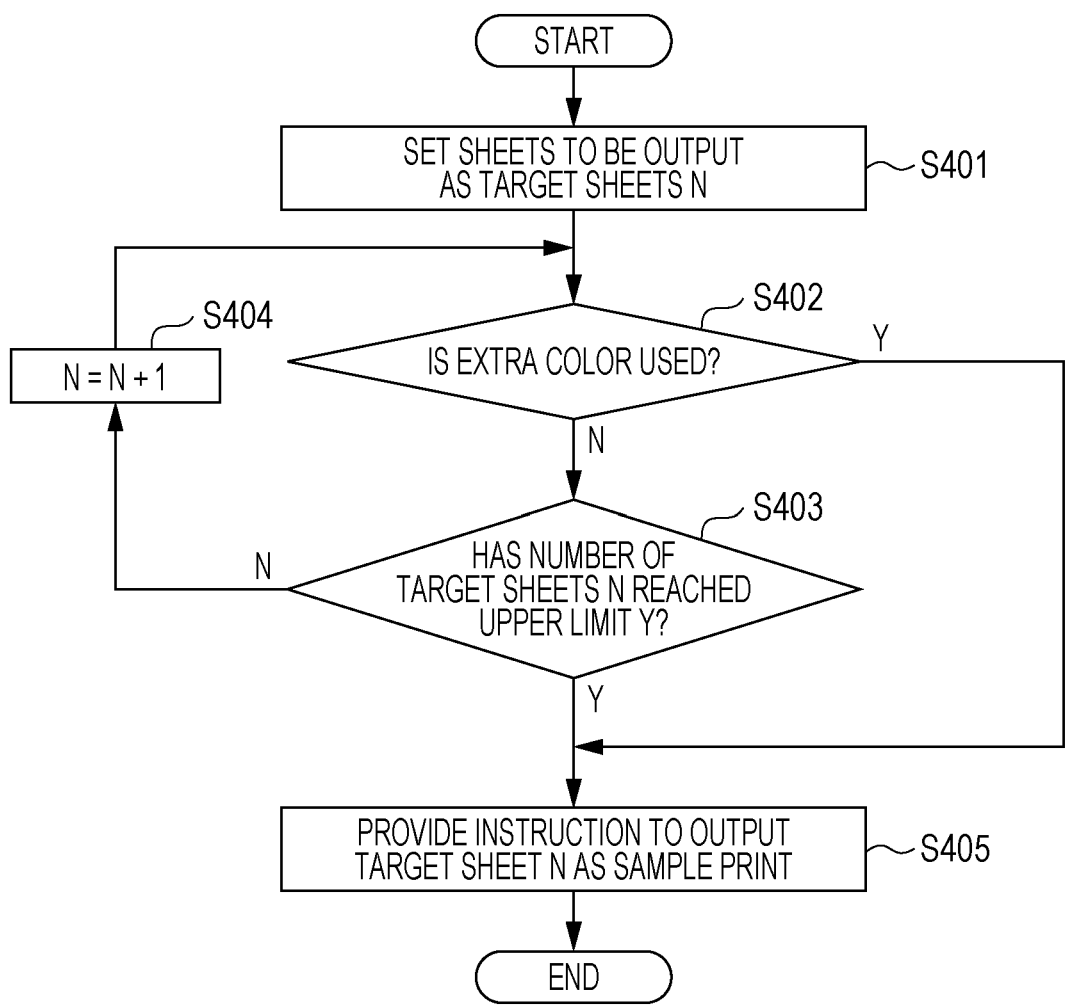
FIG. 7 is a flowchart of a fourth determination process.

FIG. 7 is a flowchart illustrating a fourth determination process of determining a sample print performed by the controller 42. The process illustrated in this flowchart is triggered by a user operation of pressing the sample button displayed on the operation unit 46 and detection of the user operation by the controller 42.

In the first determination process, a sample print is determined by using pixel density. In contrast, in the fourth determination process, a sample print is determined by using an extra color. In the second determination process illustrated in FIG. 5, the number of extra colors is used, whereas in the fourth determination process, focus is placed on an extra color itself.

First, the controller 42 sets, as target sheets N, sheets to be output in response to an output instruction (S401).

Subsequently, the controller 42 judges, for the target sheet N=1, whether or not an extra color that has been set and registered by the user or an extra color as a toner color other than CMYK process colors is used (S402).

If the judgment in step S402 is NO, that is, if no extra colors are used, the controller 42 judges whether or not the number of consecutive target sheets N in which no extra colors are used has reached a calculated upper limit Y (S403). This judgment is performed to prevent a situation from occurring where, if target sheets N in which no extra colors are used are consecutively presented, the time to determine a sample print is delayed accordingly, and the timing to output the sample print is also delayed. The calculated upper limit Y is also set in advance and stored in the ROM 36. The calculated upper limit Y is set to, for example, Y=5, but is not limited thereto. If Y=5, the controller 42 determines whether or not an extra color is used within the range of N=1 to 4.

If the judgment in step S403 is NO, that is, if the number of consecutive target sheets N in which no extra colors are used has not reached the calculated upper limit Y, the controller 42 increments the count parameter N by 1 (S404) and repeats the process from step S402.

If the judgment in step S403 is YES, that is, if the number of consecutive target sheets N in which no extra colors are used has reached the calculated upper limit Y, the controller 42 determines the target sheet N at the time to be a sample print (sample sheet) and provides an instruction to output the sample print (S405). Specifically, the controller 42 designates the upper ejection destination 52 as the ejection destination of the sample print and ejects the sample print to the upper ejection destination 52. For example, if Y=5 and if no extra colors are used in the target sheet N=4, the controller 42 ejects page 8 corresponding to N=4 to the upper ejection destination 52. Of course, page 8 is also ejected to the inner ejection destination 50, and all the pages (pages 1 to 10) are ejected to the inner ejection destination 50 regardless of which page is determined to be a sample print.

On the other hand, if the judgment in step S402 is YES, that is, if an extra color is used, the controller 42 determines the target sheet N to be a sample print (sample sheet) and provides an instruction to output the sample print (S405). For example, if an extra color is used in the target sheet N=2, the controller 42 ejects page 6 corresponding to N=2 to the upper ejection destination 52. The user is able to view the sample print that has been ejected to the upper ejection destination 52 and that has an extra color and to check the image quality and hue or the like. An effect of outputting a sample print including an extra color is apparent. After checking the image quality and hue or the like, the user continues the print job if there is no problem, or stops the print job by operating the stop button displayed on the operation unit 46 if there is a problem.

Figure 8:
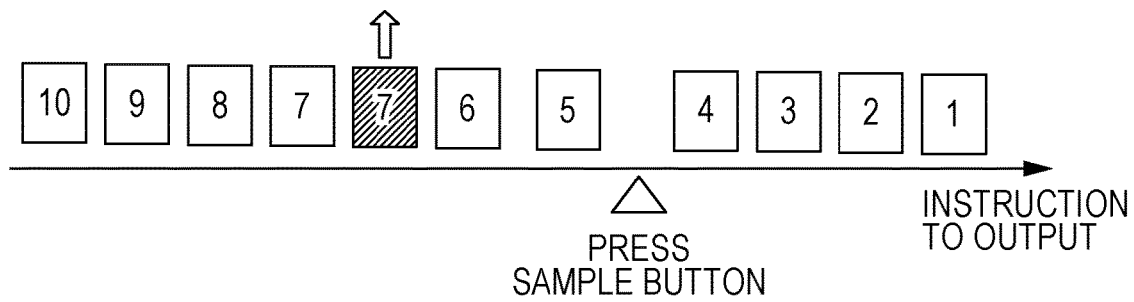
FIG. 8 is a schematic diagram illustrating ejection of a sample print in the fourth determination process.

FIG. 8 illustrates a process in a case where page 7 corresponding to N=3 is determined to be a sample print. It is assumed that the user operates the sample button after pages 1 to 4 have been output. Among pages 5 to 10 to be output, page 7 is determined to have an extra color, is determined to be a sample print, and is ejected to the upper ejection destination 52. In FIG. 8, the hatched portion indicates that the page has been determined to be a sample print, and an upward arrow indicates that the page will be ejected to the upper ejection destination 52.

Fifth Determination Process

Figure 9:
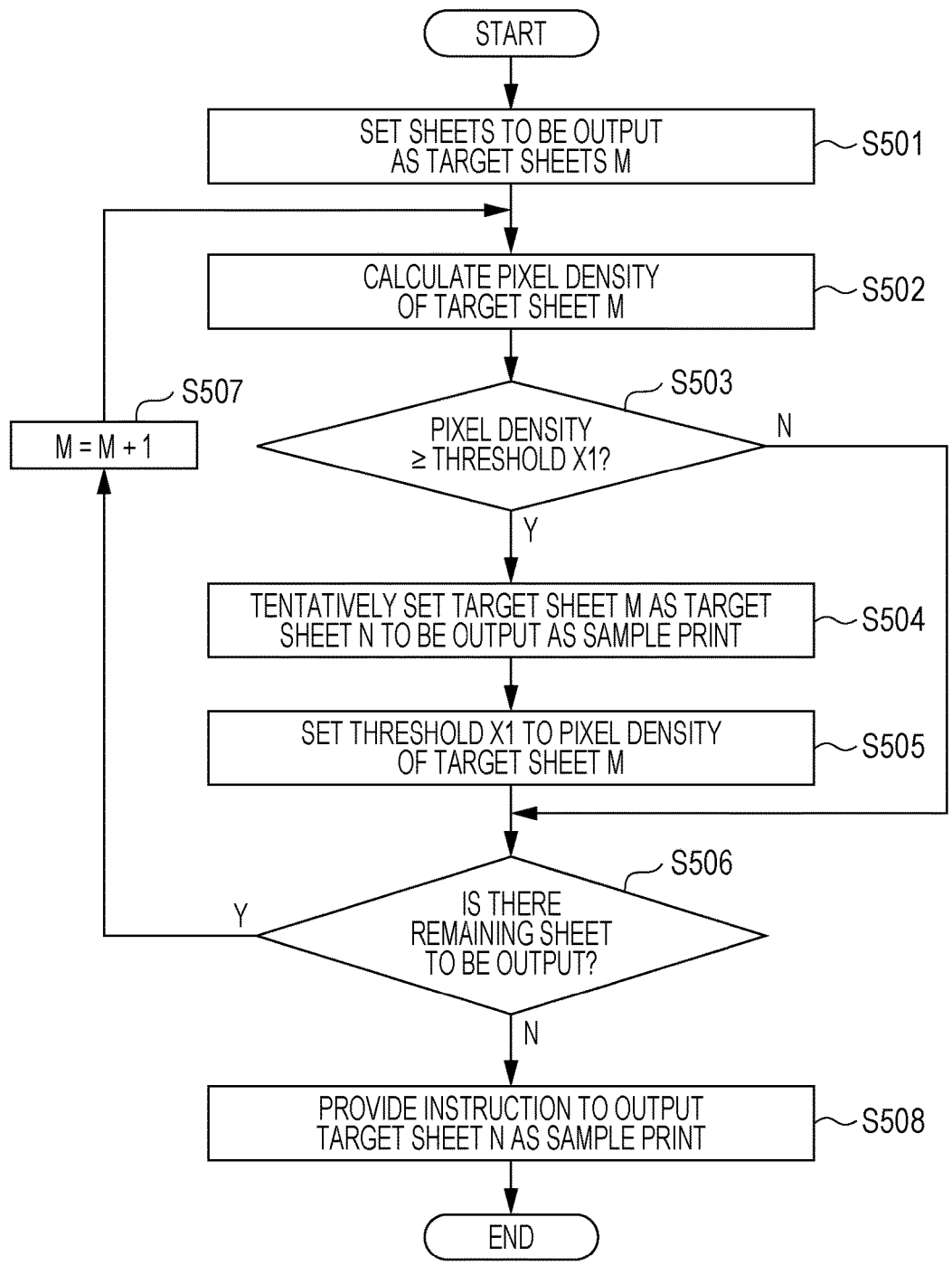
FIG. 9 is a flowchart of a fifth determination process.

FIG. 9 is a flowchart illustrating a fifth determination process of determining a sample print performed by the controller 42. The process illustrated in this flowchart is triggered by a user operation of pressing the sample button displayed on the operation unit 46 and detection of the user operation by the controller 42.

In the first to fourth determination processes, a sample print is determined by sequentially judging, for each of target sheets N, pixel density, the number of extra colors, the number of objects, or presence or absence of an extra color. In contrast, in the fifth determination process, a sample print is determined by collectively judging, for plural target sheets, pixel density.

First, the controller 42 sets, as target sheets M, sheets to be output in response to an output instruction (S501). Here, the target sheets M are sheets that may become a target of a sample print, specifically, a predetermined number of sheets among sheets to be output that have not been output at the time when the sample button is pressed in a print job. For example, in a 10-page one-sided print job, if the sample button is pressed after page 4 has been output, a predetermined number of sheets among pages 5 to 10 which have not been output, for example, pages 5 to 8, are set as target sheets M. M=1 corresponds to page 5, M=2 corresponds to page 6, M=3 corresponds to page 7, and M=4 corresponds to page 8.

Subsequently, the controller 42 calculates the pixel density of the target sheet M=1 (S502) and judges whether or not the calculated pixel density is equal to or higher than a threshold X1 (S503). The threshold X1 is a value of pixel density that is considered sufficient for the user to view a sample print and check the image quality and hue thereof, and is set in advance and stored in the ROM 36.

If the judgment in step S503 is YES, that is, if the pixel density is equal to or higher than the threshold X1, the controller 42 tentatively sets the target sheet M as a target sheet N to be output as a sample print (S504). Also, the controller 42 sets the threshold X1 to the pixel density of the target sheet M, that is, the pixel density calculated in step S502 (S505). For example, if the threshold X1 that is set as a default value is 20.00 (KB/cm$^2$) and if the calculated pixel density of the target sheet M is 21.00 (KB/cm$^2$), the threshold X1 is updated from 20.00 to 21.00.

Subsequently, the controller 42 judges whether or not there is a remaining sheet to be output in response to an output instruction among the sheets that have been set as the target sheets M (S506). If there is a remaining sheet, the controller 42 increments the parameter M by 1 (S507) and repeats the process from step S502. In the repetition, the controller 42 compares the pixel density with the threshold X1 in step S503. Note that the threshold X1 used at this time is a value that has been updated. With the reception of steps S502 to S506, the threshold X1 is sequentially updated to a higher pixel density, and a target sheet with the highest pixel density among the target sheets M is tentatively set as the target sheet N to be output as a sample print. For example, if pages 5 to 8 are set as the target sheets M and if the pixel density of page 7 is the highest, page 7 is tentatively set as the target sheet N to be output as a sample print.

On the other hand, if the judgment in step S503 is NO, that is, if the pixel density is lower than the threshold X1, the target sheet M is not tentatively set as the target sheet N to be output as a sample print, and the threshold X1 is not updated.

The foregoing process is repeatedly performed. If the judgment in step S506 is NO, that is, if the process has been performed on all the target sheets M, the controller 42 finally determines the sheet that has been tentatively set as the target sheet N to be output as a sample print to be a sample print and provides an instruction to output the sample print (S508). Specifically, the controller 42 designates the upper ejection destination 52 as the ejection destination of the sample print and ejects the sample print to the upper ejection destination 52. The user is able to view the sample print that has been ejected to the upper ejection destination 52 and that has a sufficient pixel density and to check the image quality and hue or the like. After checking the image quality and hue or the like, the user continues the print job if there is no problem, or stops the print job by operating the stop button displayed on the operation unit 46 if there is a problem.

In the fifth determination process, a sheet with the highest pixel density among a predetermined number of sheets is ejected as a sample print to the upper ejection destination 52. Thus, an appropriate sheet may be reliably ejected within a predetermined time period by a user operation of pressing the sample button.

Sixth Determination Process

Figure 10:
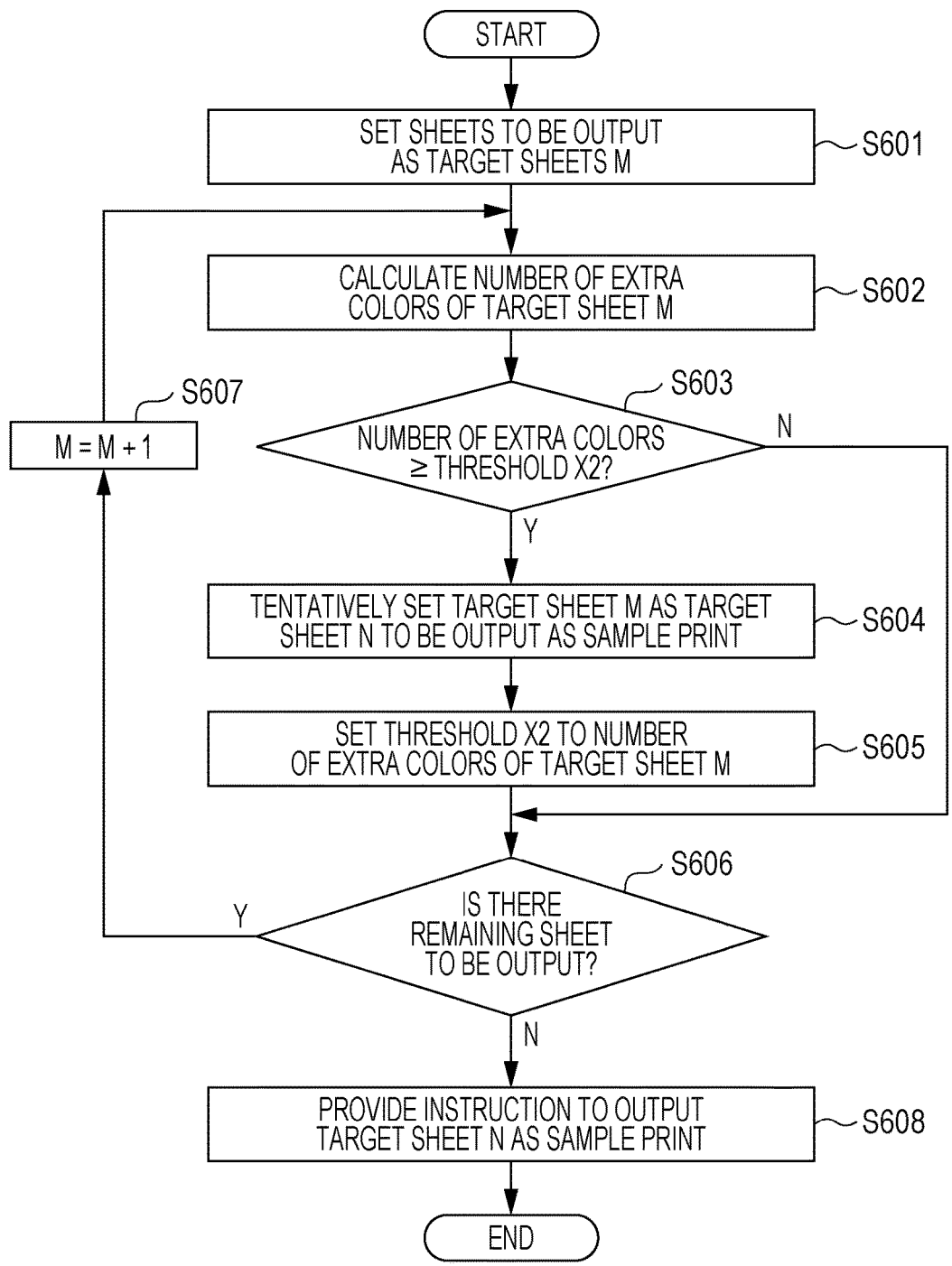
FIG. 10 is a flowchart of a sixth determination process.

FIG. 10 is a flowchart illustrating a sixth determination process of determining a sample print performed by the controller 42. The process illustrated in this flowchart is triggered by a user operation of pressing the sample button displayed on the operation unit 46 and detection of the user operation by the controller 42.

In the fifth determination processes, a sample print is determined by using pixel density. In contrast, in the sixth determination process, a sample print is determined by using the number of extra colors.

First, the controller 42 sets, as target sheets M, sheets to be output in response to an output instruction (S601). Here, the target sheets M are sheets that may become a target of a sample print, specifically, a predetermined number of sheets among sheets to be output that have not been output at the time when the sample button is pressed in a print job. For example, in a 10-page one-sided print job, if the sample button is pressed after page 4 has been output, a predetermined number of sheets among pages 5 to 10 which have not been output, for example, pages 5 to 8, are set as target sheets M. M=1 corresponds to page 5, M=2 corresponds to page 6, M=3 corresponds to page 7, and M=4 corresponds to page 8.

Subsequently, the controller 42 calculates the number of extra colors of the target sheet M=1 (S602) and judges whether or not the calculated number of extra colors is equal to or larger than a threshold X2 (S603). The threshold X2 is a value of the number of extra colors that is considered sufficient for the user to view a sample print and check the image quality and hue thereof, and is set in advance and stored in the ROM 36.

If the judgment in step S603 is YES, that is, if the number of extra colors is equal to or larger than the threshold X2, the controller 42 tentatively sets the target sheet M as a target sheet N to be output as a sample print (S604). Also, the controller 42 sets the threshold X2 to the number of extra colors of the target sheet M, that is, the number of extra colors calculated in step S602 (S605).

Subsequently, the controller 42 judges whether or not there is a remaining sheet to be output in response to an output instruction among the sheets that have been set as the target sheets M (S606). If there is a remaining sheet, the controller 42 increments the parameter M by 1 (S607) and repeats the process from step S602. In the repetition, the controller 42 compares the number of extra colors with the threshold X2 in step S603. Note that the threshold X2 used at this time is a value that has been updated. With the reception of steps S602 to S606, the threshold X2 is sequentially updated to a larger number of extra colors, and a target sheet with the largest number of extra colors among the target sheets M is tentatively set as the target sheet N to be output as a sample print. For example, if pages 5 to 8 are set as the target sheets M and if the number of extra colors of page 7 is the largest, page 7 is tentatively set as the target sheet N to be output as a sample print.

On the other hand, if the judgment in step S603 is NO, that is, if the number of extra colors is smaller than the threshold X2, the target sheet M is not tentatively set as the target sheet N to be output as a sample print, and the threshold X2 is not updated.

The foregoing process is repeatedly performed. If the judgment in step S606 is NO, that is, if the process has been performed on all the target sheets M, the controller 42 finally determines the sheet that has been tentatively set as the target sheet N to be output as a sample print to be a sample print and provides an instruction to output the sample print (S608). Specifically, the controller 42 designates the upper ejection destination 52 as the ejection destination of the sample print and ejects the sample print to the upper ejection destination 52. The user is able to view the sample print that has been ejected to the upper ejection destination 52 and that has a sufficient number of extra colors and to check the image quality and hue or the like. After checking the image quality and hue or the like, the user continues the print job if there is no problem, or stops the print job by operating the stop button displayed on the operation unit 46 if there is a problem.

Seventh Determination Process

Figure 11:
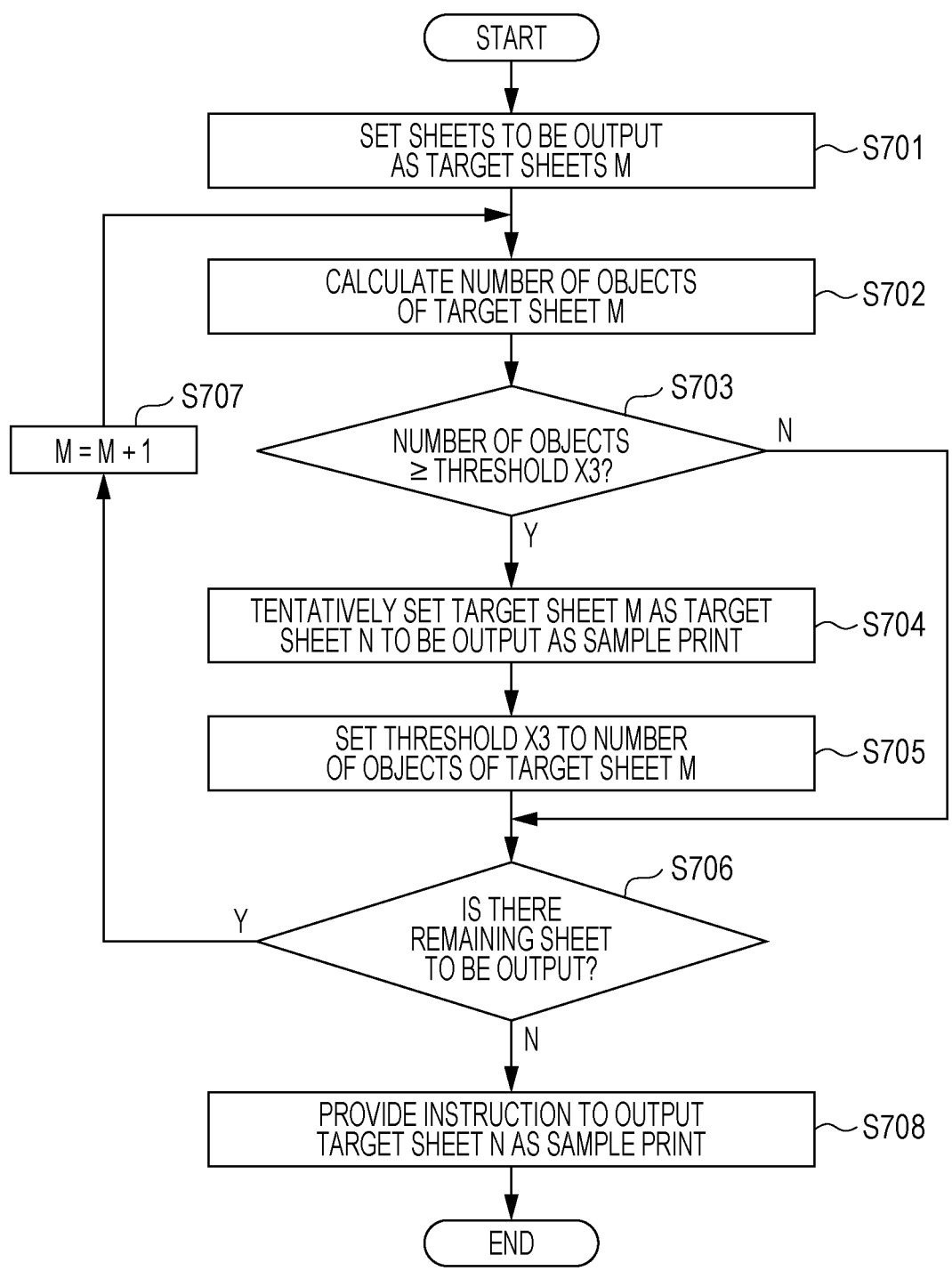
FIG. 11 is a flowchart of a seventh determination process.

FIG. 11 is a flowchart illustrating a seventh determination process of determining a sample print performed by the controller 42. The process illustrated in this flowchart is triggered by a user operation of pressing the sample button displayed on the operation unit 46 and detection of the user operation by the controller 42.

In the fifth determination processes, a sample print is determined by using pixel density. In contrast, in the seventh determination process, a sample print is determined by using the number of objects.

First, the controller 42 sets, as target sheets M, sheets to be output in response to an output instruction (S701). Here, the target sheets M are sheets that may become a target of a sample print, specifically, a predetermined number of sheets among sheets to be output that have not been output at the time when the sample button is pressed in a print job. For example, in a 10-page one-sided print job, if the sample button is pressed after page 4 has been output, a predetermined number of sheets among pages 5 to 10 which have not been output, for example, pages 5 to 8, are set as target sheets M. M=1 corresponds to page 5, M=2 corresponds to page 6, M=3 corresponds to page 7, and M=4 corresponds to page 8.

Subsequently, the controller 42 calculates the number of objects of the target sheet M=1 (S702) and judges whether or not the calculated number of objects is equal to or larger than a threshold X3 (S703). The threshold X3 is a value of the number of objects that is considered sufficient for the user to view a sample print and check the image quality and hue thereof, and is set in advance and stored in the ROM 36.

If the judgment in step S703 is YES, that is, if the number of objects is equal to or larger than the threshold X3, the controller 42 tentatively sets the target sheet M as a target sheet N to be output as a sample print (S704). Also, the controller 42 sets the threshold X3 to the number of objects of the target sheet M, that is, the number of objects calculated in step S702 (S705).

Subsequently, the controller 42 judges whether or not there is a remaining sheet to be output in response to an output instruction among the sheets that have been set as the target sheets M (S706). If there is a remaining sheet, the controller 42 increments the parameter M by 1 (S707) and repeats the process from step S702. In the repetition, the controller 42 compares the number of objects with the threshold X3 in step S703. Note that the threshold X3 used at this time is a value that has been updated. With the reception of steps S702 to S706, the threshold X3 is sequentially updated to a larger number of objects, and a target sheet with the largest number of objects among the target sheets M is tentatively set as the target sheet N to be output as a sample print. For example, if pages 5 to 8 are set as the target sheets M and if the number of objects of page 7 is the largest, page 7 is tentatively set as the target sheet N to be output as a sample print.

On the other hand, if the judgment in step S703 is NO, that is, if the number of objects is smaller than the threshold X3, the target sheet M is not tentatively set as the target sheet N to be output as a sample print, and the threshold X3 is not updated.

The foregoing process is repeatedly performed. If the judgment in step S706 is NO, that is, if the process has been performed on all the target sheets M, the controller 42 finally determines the sheet that has been tentatively set as the target sheet N to be output as a sample print to be a sample print and provides an instruction to output the sample print (S708). Specifically, the controller 42 designates the upper ejection destination 52 as the ejection destination of the sample print and ejects the sample print to the upper ejection destination 52. The user is able to view the sample print that has been ejected to the upper ejection destination 52 and that has a sufficient number of objects and to check the image quality and hue or the like. After checking the image quality and hue or the like, the user continues the print job if there is no problem, or stops the print job by operating the stop button displayed on the operation unit 46 if there is a problem.

Eighth Determination Process

Figure 12:
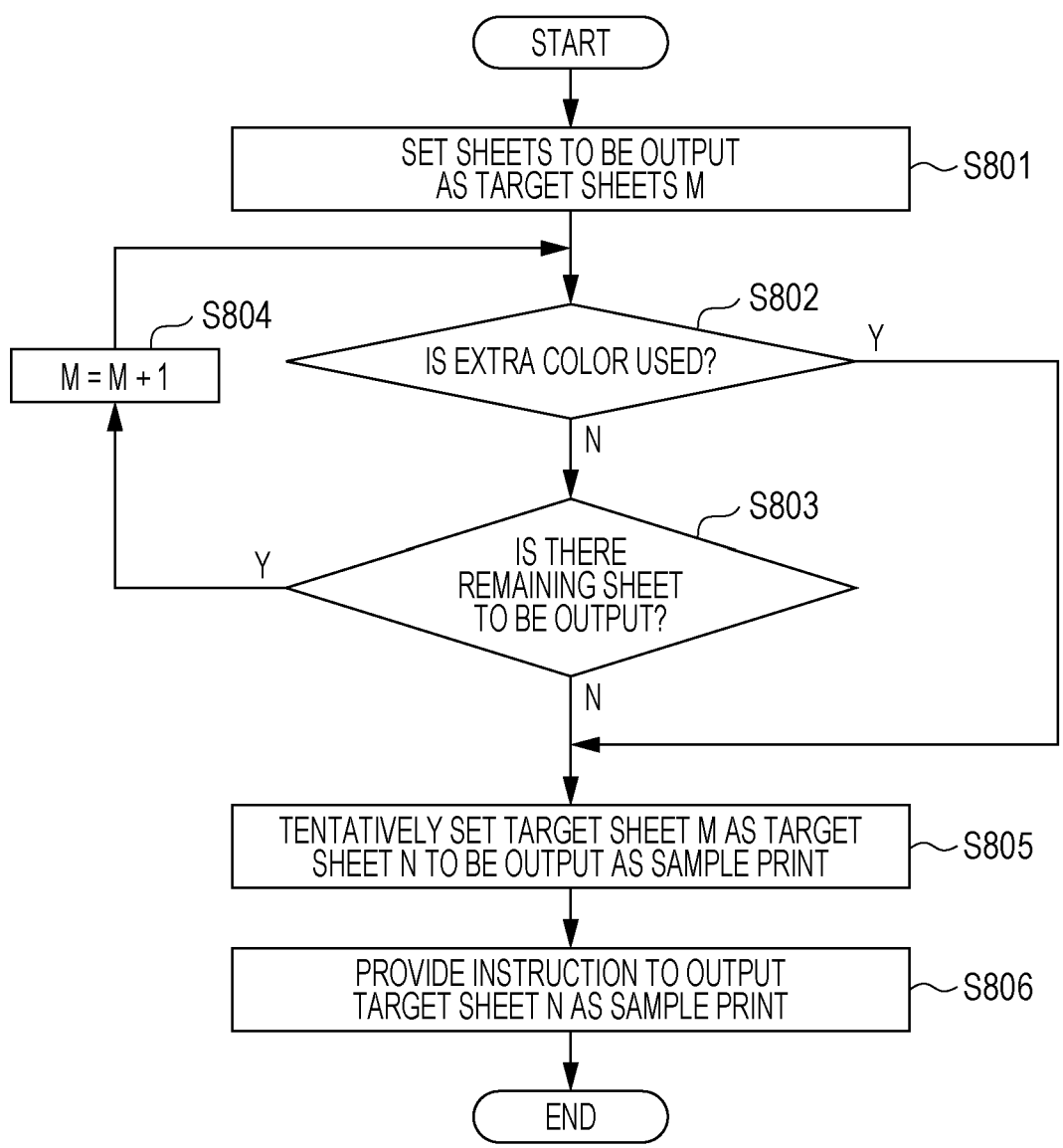
FIG. 12 is a flowchart of an eighth determination process.

FIG. 12 is a flowchart illustrating an eighth determination process of determining a sample print performed by the controller 42. The process illustrated in this flowchart is triggered by a user operation of pressing the sample button displayed on the operation unit 46 and detection of the user operation by the controller 42.

In the sixth determination processes, a sample print is determined by using the number of extra colors. In contrast, in the eighth determination process, a sample print is determined by using an extra color itself.

First, the controller 42 sets, as target sheets M, sheets to be output in response to an output instruction (S801). Here, the target sheets M are sheets that may become a target of a sample print, specifically, a predetermined number of sheets among sheets to be output that have not been output at the time when the sample button is pressed in a print job. For example, in a 10-page one-sided print job, if the sample button is pressed after page 4 has been output, a predetermined number of sheets among pages 5 to 10 which have not been output, for example, pages 5 to 8, are set as target sheets M. M=1 corresponds to page 5, M=2 corresponds to page 6, M=3 corresponds to page 7, and M=4 corresponds to page 8.

Subsequently, the controller 42 judges whether or not an extra color is used in the target sheet M=1 (S802).

If the judgment in step S802 is NO, that is, if no extra colors are used, the controller 42 judges whether or not there is a remaining sheet to be output in response to an output instruction among the sheets that have been set as the target sheets M (S803). If there is a remaining sheet, the controller 42 increments the parameter M by 1 (S804) and repeats the process from step S802.

If the judgment in step S802 is YES, that is, if an extra color is used, the controller 42 tentatively sets the target sheet M as a target sheet N to be output as a sample print (S805). If no extra colors are used in all the target sheets M, the controller 42 tentatively sets the last sheet as a target sheet N to be output as a sample print.

After the forgoing process has been performed on all the target sheets M, the controller 42 finally determines the sheet that has been tentatively set as the target sheet N to be output as a sample print to be a sample print and provides an instruction to output the sample print (S806). Specifically, the controller 42 designates the upper ejection destination 52 as the ejection destination of the sample print and ejects the sample print to the upper ejection destination 52. The user is able to view the sample print that has been ejected to the upper ejection destination 52 and that includes an extra color and to check the image quality and hue or the like. After checking the image quality and hue or the like, the user continues the print job if there is no problem, or stops the print job by operating the stop button displayed on the operation unit 46 if there is a problem.

Ninth Determination Process

In the first to third determination processes, the pixel density, the number of extra colors, and the number of objects are compared with the thresholds X1, X2, and X3, respectively, and a sheet in which the value is equal to or larger than the threshold is determined to be a sample print. The thresholds X1, X2, and X3 are not necessarily fixed values and may be variable values that sequentially change with time, for example, decrease with time.

Figure 13:
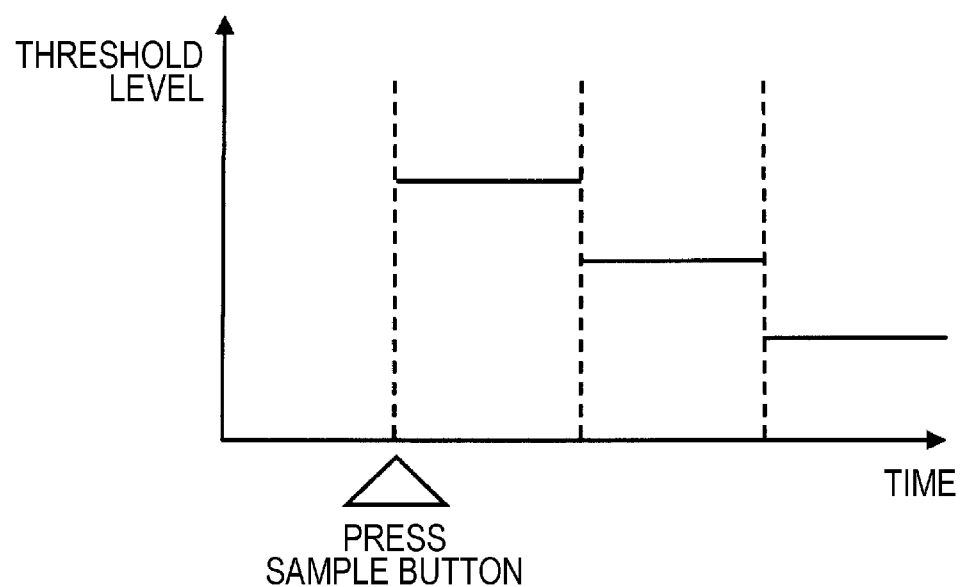
FIG. 13 is a graph illustrating temporal changes in a threshold.

FIG. 13 illustrates temporal changes in the level of the threshold X1 in the first determination process. In response to a user operation of pressing the sample button at certain timing, the level of the threshold X1 is decreased step by step at a predetermined time interval Δt. In the first determination process, the pixel densities of the target sheets N are sequentially calculated and compared with the threshold X1. If sheets in which pixel density is lower than the threshold X1 are consecutively presented, the timing to output the sample print is delayed accordingly.

On the other hand, if the threshold X1 is decreased step by step as illustrated in FIG. 13, the possibility that the pixel density of the target sheet N is equal to or higher than the threshold X1 increases, and thus delay of output of the sample print may be prevented.

Figure 14:
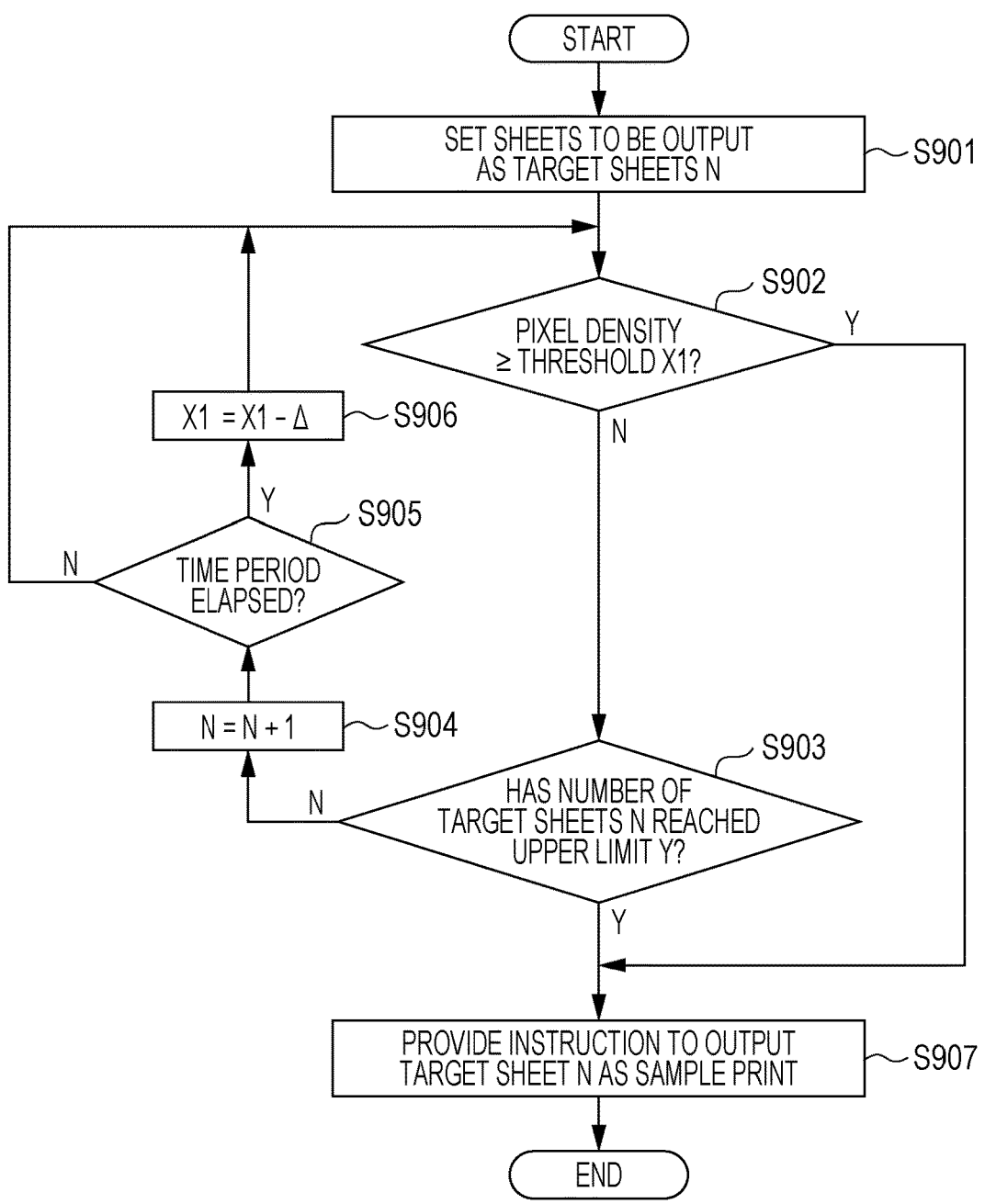
FIG. 14 is a flowchart of a ninth determination process.
Figure 15A:
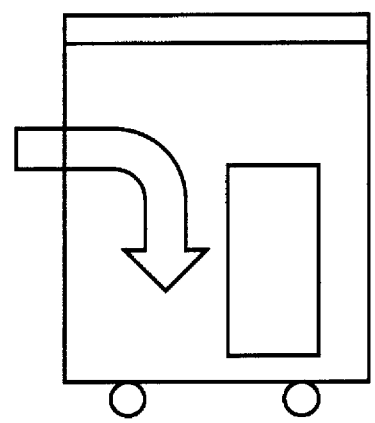
FIGS. 15A to 15C are diagrams illustrating the concept of dynamic sample print according to the related art.
Figure 15B:
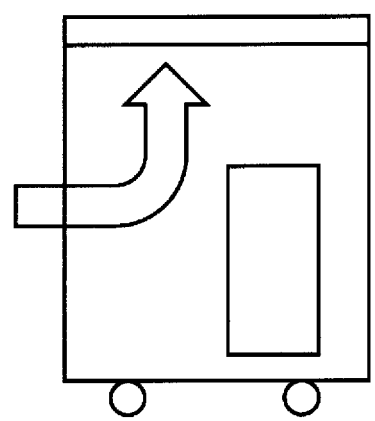
Figure 15C:
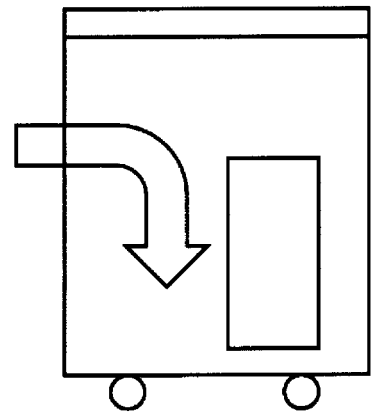

FIG. 14 is a flowchart illustrating a ninth determination process of determining a sample print performed by the controller 42. The process illustrated in this flowchart is triggered by a user operation of pressing the sample button displayed on the operation unit 46 and detection of the user operation by the controller 42.

First, the controller 42 sets, as target sheets N, sheets to be output in response to an output instruction (S901). Here, the target sheets N are sheets that may become a target of a sample print, specifically, sheets to be output that have not been output at the time when the sample button is pressed in a print job. For example, in a 10-page one-sided print job, if the sample button is pressed after page 4 has been output, pages 5 to 10 which have not been output are set as target sheets N.

Subsequently, the controller 42 calculates the pixel density of the target sheet N=1 and judges whether or not the calculated pixel density is equal to or higher than a threshold X1 (S902). The threshold X1 is a value of pixel density that is considered sufficient for the user to view a sample print and check the image quality and hue thereof, and a default value is set in advance and stored in the ROM 36.

If the judgment in step S902 is NO, that is, if the pixel density is lower than the threshold X1, the controller 42 judges whether or not the number of consecutive target sheets N in which pixel density is lower than the threshold X1 has reached a calculated upper limit Y (S903). This judgment is performed to prevent a situation from occurring where, if target sheets N in which pixel density is lower than the threshold X1 are consecutively presented, the time to determine a sample print is delayed accordingly, and the timing to output the sample print is also delayed. The calculated upper limit Y is also set in advance and stored in the ROM 36. The calculated upper limit Y is set to, for example, Y=5, but is not limited thereto. If Y=5, the controller 42 calculates pixel density within the range of N=1 to 4 and compares the calculated pixel density with the threshold X1.

If the judgment in step S903 is NO, that is, if the number of consecutive target sheets N in which pixel density is lower than the threshold X1 has not reached the calculated upper limit Y, the controller 42 increments the count parameter N by 1 (S904). Subsequently, the controller 42 judges whether or not a predetermined time period $\Delta t$ has elapsed since pressing of the sample button (S905). If the predetermined time period $\Delta t$ has elapsed, the controller 42 decreases the level of the threshold X1 by a predetermined amount $\Delta$ (S906). That is, the controller 42 updates the threshold X1 to X1−$\Delta$ (S906). After updating the threshold X1 in accordance with the lapse of time, the controller 42 repeats the process from step S902. Accordingly, if the initial value of the threshold X1 is 20.00 and if $\Delta$=2.00, the threshold X1 decreases step by step from 20.00 to 18.00, 16.00, 14.00, and so forth.

If the judgment in step S903 is YES, that is, if the number of consecutive target sheets N in which pixel density is lower than the threshold X1 has reached the calculated upper limit Y, the controller 42 determines the target sheet N at the time to be a sample print (sample sheet) and provides an instruction to output the sample print (S907). Specifically, the controller 42 designates the upper ejection destination 52 as the ejection destination of the sample print and ejects the sample print to the upper ejection destination 52.

On the other hand, if the judgment in step S902 is YES, that is, if the pixel density is equal to or higher than the threshold X1, the controller 42 determines the target sheet N to be a sample print (sample sheet) and provides an instruction to output the sample print (S907). The user is able to view the sample print that has been ejected to the upper ejection destination 52 and that has a sufficient pixel density and to check the image quality and hue or the like. After checking the image quality and hue or the like, the user continues the print job if there is no problem, or stops the print job by operating the stop button displayed on the operation unit 46 if there is a problem.

In the ninth determination process, if the pixel density is lower than the threshold X1, the possibility that the pixel density is equal to or higher than the threshold X1 increases as the threshold X1 decreases step by step with lapse of time. Accordingly, the corresponding sheet is likely to be ejected to the upper ejection destination 52 as a sample print.

In the ninth determination process, the lower limit of the threshold X1 may be set. In this case, whether or not the threshold X1 has reached the lower limit may be judged between steps S905 and S906, and step S906 may be performed if the threshold X1 has not reached the lower limit.

Like the threshold X1, the thresholds X2 and X3 in the second and third determination processes may be decreased with lapse of time.

The exemplary embodiment of the present invention has been described above. The present invention is not limited to the exemplary embodiment, and various modifications may be implemented.

For example, in the above-described determination processes, a sample print is determined by using pixel density, the number of extra colors, or the number of objects. Alternatively, a sample print may be determined by appropriately combining these parameters. Specific examples are as follows.

(a) Pixel density and number of extra colors
(b) Number of extra colors and number of objects
(c) Pixel density and number of objects For example, in the example (a), a sheet in which the pixel density is equal to or higher than the threshold X1 and the number of extra colors is equal to or larger than the threshold X2 is determined to be a sample print.

Alternatively, all the pixel density, the number of extra colors, and the number of objects may be used, and a sheet in which at least one of the pixel density, the number of extra colors, and the number of objects is equal to or larger than the threshold may be determined to be a sample print. Alternatively, the number of colored pixels, the object size, or object color information may be used instead of the pixel density.

Alternatively, a sample print may be determined by appropriately combining a specific extra color with at least one of the pixel density, the number of colored pixels, the number of extra colors, the number of objects, the object size, and the object color information. Specific examples are as follows.

(a) Pixel density and specific extra color
(b) Number of objects and specific extra color
(c) Number of extra colors and specific extra color
(d) Pixel density, number of objects, and specific extra color
(e) Number of colored pixels, number of objects, and specific extra color
(f) Number of colored pixels, object size, and specific extra color
(g) Number of colored pixels, object size, object color information, and specific extra color For example, in the example (a), a sheet in which a specific extra color is used is determined to be a sample print, and if no specific extra colors are used, a sheet in which the pixel density is equal to or higher than the threshold X1 is determined to be a sample print.

Alternatively, a sheet in which the pixel density is equal to or higher than the threshold X1 is determined to be a sample print, and if the pixel density is lower than the threshold X1, a sheet in which a specific extra color is used is determined to be a sample print. In the process illustrated in FIG. 3, if the calculated upper limit Y is reached, that is, if the pixel densities of the preceding consecutive sheets are lower than the threshold X1, the sheet at the time, that is, the last one of the target sheets N is determined to be a sample print. However, if the target sheets N include a sheet in which the specific extra color is used, the sheet is determined to be a sample print. The same applies to the combination between the number of objects and a specific extra color. In the example (c), a sheet in which the number of extra colors is equal to or larger than the threshold X2 is determined to be a sample print. If the number of extra colors is smaller than the threshold X2, a sheet in which a specific extra color is used may be determined to be a sample print.

In the above-described determination processes, the pixel density, the number of colored pixels, the number of extra colors, the number of objects, the object size, or the object color information is calculated from rendered data, but these parameters may be calculated from intermediate data. Also in the case of calculating the parameters from intermediate data, a result is the same as in the case of calculating the parameters from the rendered data. Thus, both processes may be regarded as substantially identical processes.

In the exemplary embodiment, in response to pressing of the sample button, a sample print is determined by using pixel density or another parameter and the sample print is ejected to the upper ejection destination 52 while ejection to the inner ejection destination 50 is continued. Alternatively, at the timing when the sample button is pressed, ejection to the inner ejection destination 50 may be stopped, a sample print may be ejected to the upper ejection destination 52 as an interrupt process, and then ejection to the inner ejection destination 50 may be restarted. In this case, however, pressing of the sample button stops the print job and causes a standby state, which may reduce productivity. Thus, it may be better to determine a sample print and eject the sample print to the upper ejection destination 52 without stopping the print job, as in the exemplary embodiment.

In the exemplary embodiment, a description has been given of a dynamic sample print function in which a sample print is output in response to a user operation of pressing a sample button during a print job. The exemplary embodiment is also applicable to static sample print in which a sample print is output at a predetermined interval, for example, every preset number of sheets, every preset number of copies, or at a preset time interval.

For example, a description will be given of the case of outputting a sample print every preset number of sheets.

The number of output sheets is counted, and if the number of output sheets reaches a preset number, the pixel density of the sheet to be output next is calculated and compared with the threshold X1. If the pixel density is equal to or higher than the threshold X1, the sheet is determined to be a sample print and is ejected to the upper ejection destination 52. On the other hand, if the pixel density is lower than the threshold X1, the pixel density of the next sheet is calculated and compared with the threshold X1. This process is repeated until the number of consecutive sheets reaches the calculated upper limit Y, and thereby a sample print is determined.

Since a sample print is output every predetermined number of sheets, the calculated upper limit Y may be as small as possible, for example, 2 to 3. However, the exemplary embodiment is not limited thereto.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a first ejection tray configured to receive a plurality of sheets belonging to a print job, the plurality of sheets having an image formed thereon by using rendered data;
   a second ejection tray configured to receive a sample print selected from the plurality of sheets belonging to the print job, the sample print being a single sheet of the plurality of sheets; and
   a controller configured to select the sample print from the plurality of sheets belonging to the print job upon the sample print being requested during a performance of the print job by:
      using the rendered data of each of the plurality of sheets belonging to the print job and remaining to be printed by the image forming apparatus, the rendered data selected from a group consisting of: pixel density, number of colored pixels, number of extra colors, number of objects, object size, and object color information; and
      comparing the rendered data of each of the plurality of sheets belonging to the print job and remaining to be printed by the image forming apparatus with a threshold.

2. The image forming apparatus according to claim 1, wherein the controller is configured to select the single sheet serving as the sample print from the plurality of sheets belonging to the print job based on information indicating presence or absence of a specific extra color, the information being included in the rendered data.

3. The image forming apparatus according to claim 1, wherein the controller is configured to select, as the single sheet serving as the sample print, a sheet in which of the pixel density, the number of colored pixels, the number of extra colors, the number of objects, the object size, and the object color information that are included in the rendered data is equal to or larger than a threshold, from the plurality of sheets belonging to the print job and having the image formed thereon by using the rendered data.

4. The image forming apparatus according to claim 3, wherein the controller is configured to select the single sheet serving as the sample print from the plurality of sheets belonging to the print job based on, for each of the plurality of sheets having the image formed thereon by using the rendered data, at least one of the pixel density, the number of extra colors, and the number of objects that are included in the rendered data of each of the plurality of sheets belonging to the print job.

5. The image forming apparatus according to claim 3, wherein the controller is configured to select, as the single sheet serving as the sample print, a sheet in which at least one of the pixel density, the number of colored pixels, the number of extra colors, the number of objects, the object size, and the object color information that are included in the rendered data has a largest value among a predetermined number of plurality of sheets, from the plurality of sheets belonging to the print job and having the image formed thereon by using the rendered data of each of the plurality of sheets belonging to the print job.

6. The image forming apparatus according to claim 3, wherein the threshold decreases as time elapses.

7. The image forming apparatus according to claim 1, further comprising:
   an operation unit configured to provide an instruction to output the sample print, wherein the controller is configured to select the single sheet serving as the sample print in response to an operation performed on the operation unit.

8. The image forming apparatus according to claim 1, wherein the controller is configured to select the single sheet serving as the sample print from the plurality of sheets belonging to the print job at a predetermined interval.

9. An image forming apparatus comprising:
a first ejection tray configured to receive a plurality of sheets belonging to a print job, the plurality of sheets having an image formed thereon by using rendered data;
a second ejection tray configured to receive a sample print selected from the plurality of sheets belonging to the print job, the sample print being a single sheet of the plurality of sheets; and
a controller configured to select the sample print from the plurality of sheets belonging to the print job upon the sample print being requested during a performance of the print job by:
using the rendered data of each of the plurality of sheets belonging to the print job and remaining to be printed by the image forming apparatus, the rendered data including information indicating presence or absence of an extra color; and
comparing the rendered data of each of the plurality of sheets belonging to the print job and remaining to be printed by the image forming apparatus with a threshold.

10. A non-transitory computer readable medium storing a program causing a computer to execute a process, the process comprising:
receiving a print job;
generating intermediate data by interpreting the received print job;
generating rendered data from the intermediate data;
ejecting, to a first ejection tray, a plurality of sheets belonging to the print job, the plurality of sheets having an image formed thereon by using the rendered data; and
ejecting, to a second ejection tray, a sample print selected as a single sheet from the plurality of sheets belonging to the print job upon the sample print being requested during a performance of the print job, the sample print being selected from the plurality of sheets belonging to the print job by:
using the rendered data of each of the plurality of sheets belonging to the print job and remaining to be printed by the image forming apparatus, the rendered data selected from a group consisting of: pixel density, number of colored pixels, number of extra colors, number of objects, object size, and object color information; and
comparing the rendered data of each of the plurality of sheets belonging to the print job and remaining to be printed by the image forming apparatus with a threshold.

11. The non-transitory computer readable medium according to claim 10, wherein, in the ejecting to the second ejection tray, the sample print is selected from the plurality of sheets belonging to the print job based on information indicating presence or absence of a specific extra color.

12. A non-transitory computer readable medium storing a program causing a computer to execute a process, the process comprising:
receiving a print job;
generating intermediate data by interpreting the received print job;
generating rendered data from the intermediate data;
ejecting, to a first ejection tray, a plurality of sheets belonging to the print job, the plurality of sheets having an image formed thereon by using the rendered data; and
ejecting, to a second ejection tray, a sample print selected from the plurality of sheets belonging to the print job, the sample print being selected from the plurality of sheets belonging to the print job by:
using the rendered data of each of the plurality of sheets belonging to the print job upon the sample print being requested during a performance of the print job, the rendered data including information indicating presence or absence of an extra color; and
comparing the rendered data of each of the plurality of sheets belonging to the print job and remaining to be printed by the image forming apparatus with a threshold.

* * * * *